US007019245B2

(12) United States Patent
Bermann et al.

(10) Patent No.: US 7,019,245 B2
(45) Date of Patent: Mar. 28, 2006

(54) METHOD AND APPARATUS FOR EROSION MACHINING WITH AN ELECTRICAL CONTACT ELEMENT

(75) Inventors: Johann Bermann, Muenchsmuenster (DE); Titus Meister, Mainburg (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 11/000,974

(22) Filed: Dec. 2, 2004

(65) Prior Publication Data
US 2005/0184030 A1 Aug. 25, 2005

(30) Foreign Application Priority Data
Dec. 3, 2003 (DE) ................. 103 56 394

(51) Int. Cl.
*B23H 1/00* (2006.01)
*B23H 9/00* (2006.01)

(52) U.S. Cl. .................. 219/69.11; 219/69.17; 219/69.2

(58) Field of Classification Search ............. 219/69.11, 219/69.15, 69.17, 69.2; 204/224 M; 205/665, 205/686
See application file for complete search history.

(56) References Cited

U.S. PATENT DOCUMENTS
4,491,713 A 1/1985 Patton et al.
4,628,172 A * 12/1986 Inoue ...................... 219/69.12
5,906,495 A * 5/1999 Morgan ......................... 439/92
2004/0238497 A1* 12/2004 Meister et al. .............. 219/69.2

FOREIGN PATENT DOCUMENTS
| DE | 19631457 | | 9/1988 |
| DE | 10135587 | | 2/2003 |
| DE | 10135587 A1 | * | 2/2003 |
| JP | 62-228324 A | * | 10/1987 |

* cited by examiner

*Primary Examiner*—Geoffrey S. Evans
(74) *Attorney, Agent, or Firm*—Greenblum & Bernstein, P.L.C.

(57) ABSTRACT

Apparatus and method for erosion machining a structure comprising one of a metallic structural component, a metallic insert element, and a connecting element, by way of erosion. The apparatus includes an eroding head including an electrode, a power supply, and a control device. The power supply and the control device produce an erosion current. A grounding device is arranged in an area of the eroding head and includes at least one contact element. When the eroding head is arranged to perform erosion machining, the at least one contact element contacts and forms an electrical connection with a surface of the structure, whereby an eroding electric circuit is formed via the electrode and the structure. The method includes arranging the erosion head in an area of the connecting element, sealing, with a seal, a flushing cage to the structural component, contacting a portion the connecting element with the electrode; and electrically connecting the at least one contact element and another portion of the connecting element. This Abstract is not intended to define the invention disclosed in the specification, nor intended to limit the scope of the invention in any way.

28 Claims, 5 Drawing Sheets

Fig. 3

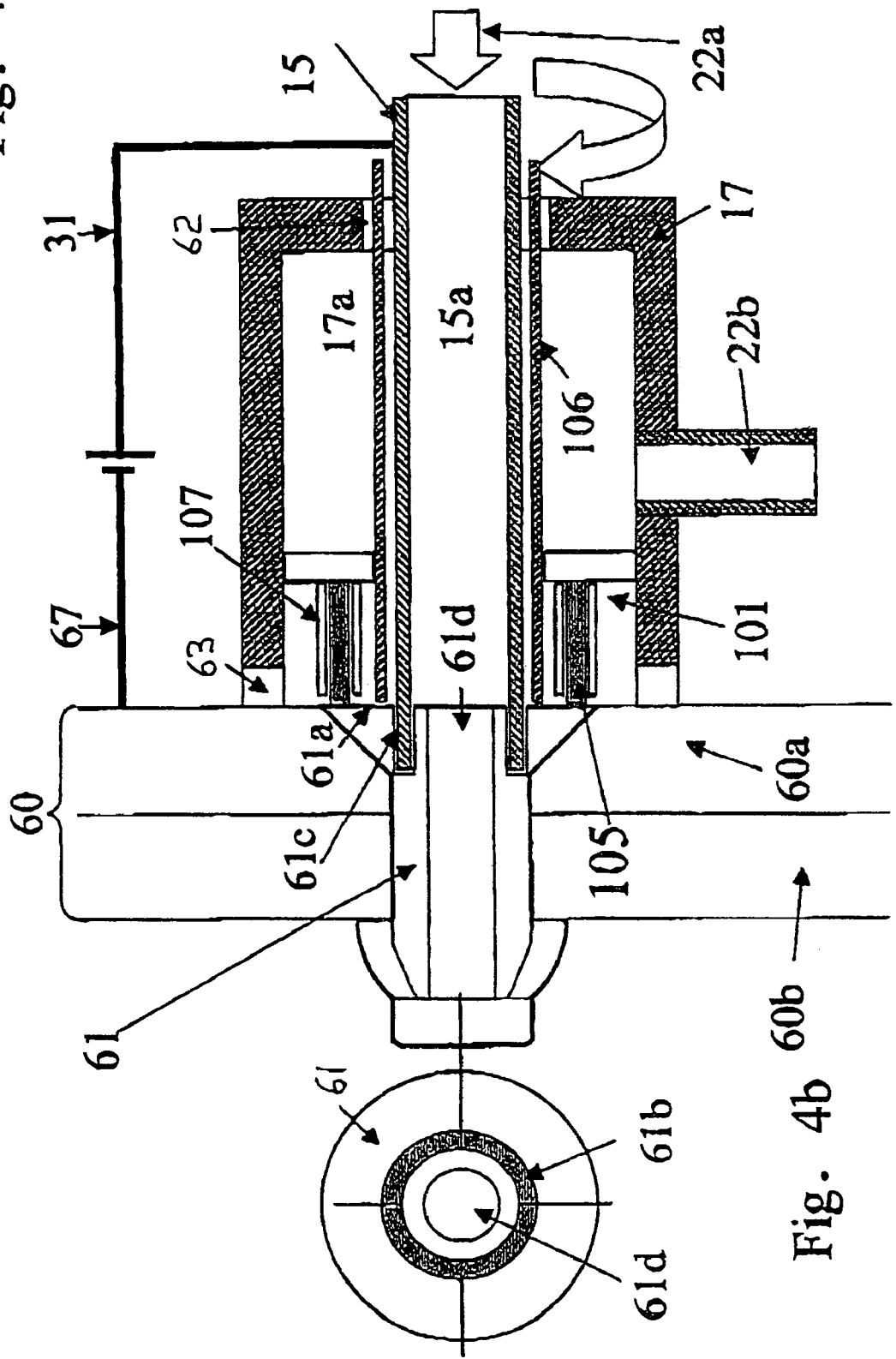

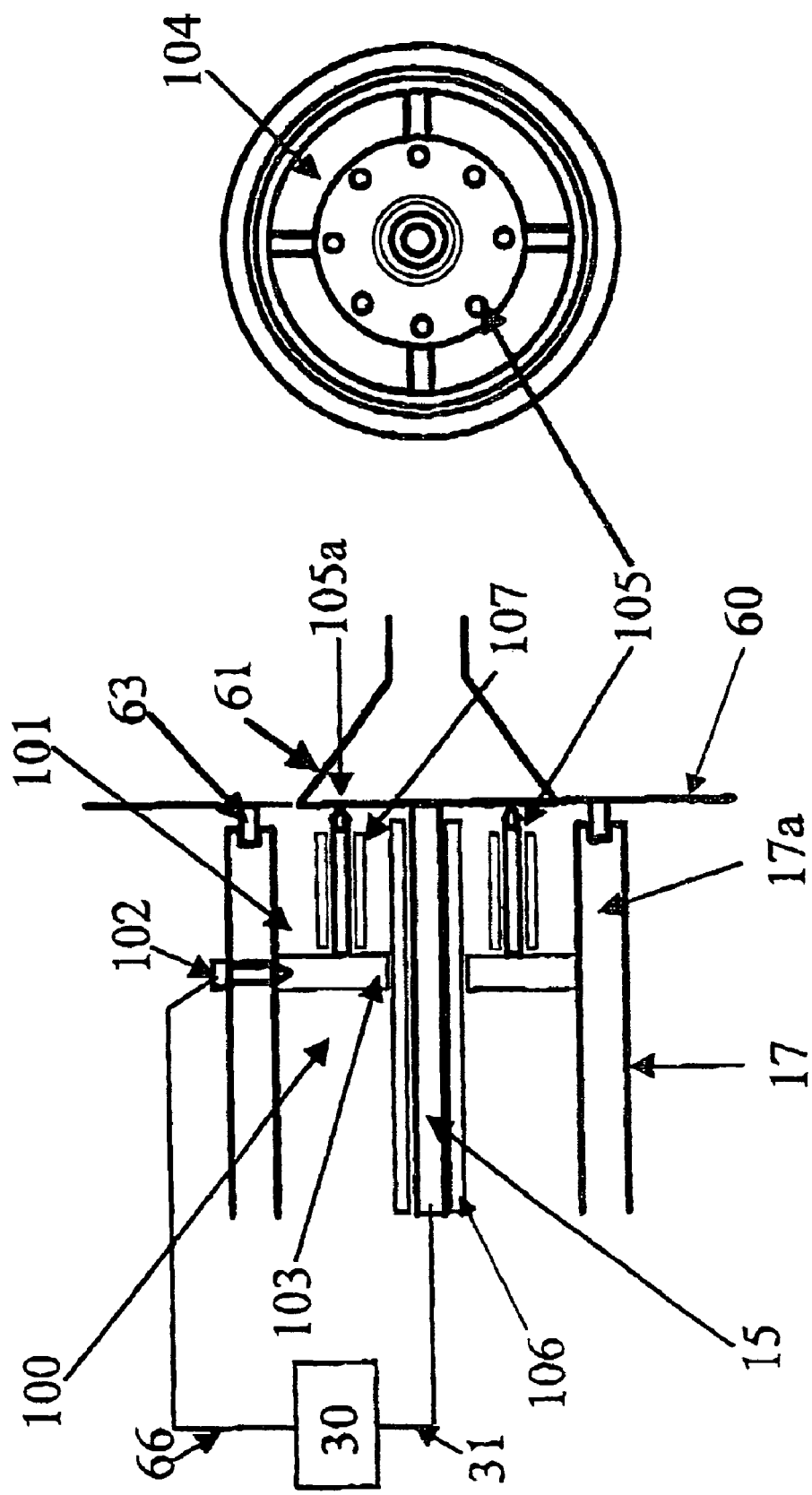

METHOD AND APPARATUS FOR EROSION MACHINING WITH AN ELECTRICAL CONTACT ELEMENT

CROSS-REFERENCE TO RELATED APPLICATIONS

The present application claims priority under 35 U.S.C. §119 of German Patent Application No. 103 56 394.6, filed on Dec. 3, 2003, the disclosure of which is expressly incorporated by reference herein in its entirety.

BACKGROUND OF THE INVENTION

1. Field of the Invention

The invention relates to an erosion apparatus for the shaping machining of a metallic structural component or insert element as well as a method for the eroding of such elements or components with an erosion apparatus. This machining can include the machining of a metallic structural component or can include the machining of a metallic insert element in a non-metallic structural component or the machining of a metallic insert element placed in an insulated manner in a metallic structural component. In the two latter alternatives, the removal of metallic connecting elements from structural components is concerned in particular.

2. Discussion of Background Information

Erosion processes are known from the general prior art with which structural components are machined in a shaping manner by way of an electrode. In these methods, the material in the vicinity of the erosion processes is impaired. For this reason prior methods are not usable on components or structural components whose material properties can be changed in an inadmissible manner by the erosion process.

To remove connecting elements from structural components, tap drills were previously used that cut the connecting element to be removed, e.g., the rivet, centrally. A disadvantage of this drilling process is that structural parts that are held together by the connecting elements may be damaged. This is particularly the case when rivets are to be removed, since they must be bored out up to the transition point lying between the rivet head and the rivet neck, and at this point, the structural parts connected with the rivet are adjacent each other.

In aircraft construction, in particular, connection rivets with high-tensile drawing mandrels are used at points that are accessible only on one side. Thus a very hard material is present precisely in the center of the rivet, so that when connecting elements are removed according to the prior art, the following further problems result: the quality of the centering, i.e., the precision with which the power drill is applied, depends on the manual dexterity of the craftsman, resulting however in a scatter with relatively imprecise centerings. Moreover, the tool, i.e., the drill, wears particularly severely at draw rivets as a function of the pressing pressure exerted. Another disadvantage is a possible heat development that occurs, in particular, when the cutting action of the drill decreases sharply due to wear, or the rivet turns together with the tool, which causes increased frictional heat and through which damage to the structure (structural change) can occur.

For these reasons this drilling process is only suitable to a limited extent for the removing of connection rivets with drawing mandrels.

SUMMARY OF THE INVENTION

The invention provides for an erosion apparatus for the shaping machining of a metallic structural component or a metallic insert element in a non-metallic structural component, in particular, for the removing of metallic connecting elements, as well as a method for the eroding of such components or elements, with which a removal of connecting elements from structural parts is possible, and as economical as possible, and that can be used on the greatest possible number of materials for the structural parts.

According to the invention, there is provided an erosion apparatus for the shaping machining of a metallic structural component or a metallic insert element or connecting element by way of erosion when the apparatus features a drill head with an electrode, an erosion power supply, and an erosion control for producing an erosion current for the erosion of the structural component or the insert element or connecting element. At the eroding head, a grounding device is arranged, with at least one ground contact element that can be brought into contact connection with the upper side of the structural component or the insert element or connecting element when the eroding head is being positioned for the erosion process, in order to produce an eroding electric circuit via a tubular electrode and the connecting element to be eroded. A mechanism can be provided through which the free contact ends of the at least one ground contact element can be retracted against a spring force.

One advantage of the erosion apparatus according to the invention with the grounding device, or of the method according to the invention, is that with either of these, a reduction of process times as well as a reduction in tool wear can be achieved due to an improvement of the current flow. Through the solution according to the invention, the process parameters can be ascertained and monitored better. Moreover, the spatial limitation of the current flow enables the resulting electrical field to be made more compact, so that the interference behavior of the erosion apparatus internally and externally is reduced.

The solution according to the invention with the grounding device can be used without a flushing cage on metallic structural components that are immersed in a dielectric bath. The solution according to the invention enables, e.g., the introduction of exact bores or chips without the material structure in the vicinity being changed.

The use of a flushing cage is to be provided during the machining of metallic structural components and of metallic insert elements such as, e.g., connecting elements or insert elements such as insert sleeves, in non-metallic structural components. The solution according to the invention with the grounding device enables the targeted machining of the connecting elements for a great variety of applications. The solution according to the invention with the grounding device is particularly advantageous in the machining of metallic connecting elements that are inserted into likewise metallic structural components with non-metallic sealing arrangements such as, e.g., sealing rings or sealing compounds, for the purposes of insulation or sealing.

The invention also provides for an apparatus for erosion machining a structure comprising one of a metallic structural component, a metallic insert element, and a connecting element, by way of erosion, wherein the apparatus comprises an eroding head including an electrode, a power supply, and a control device. The power supply and the control device produce an erosion current. A grounding device is arranged in an area of the eroding head and comprising at least one contact element. When the eroding head is arranged to perform erosion machining, the at least one contact element contacts and forms an electrical connection with a surface of the structure, whereby an eroding electric circuit is formed via the electrode and the structure.

The eroding head may comprise a drill head and wherein the electrode comprises a tubular electrode. The at least one contact element may comprise at least one of a retractable contact end and a spring biased retractable spring contact end. The at least one contact element may comprise a plurality of contact elements arranged generally concentrically around the electrode. The plurality of contact elements may be at least one of switchable electrically and switchable electrically in parallel. Shank portions of the plurality of contact elements may be at least one of electrically insulated and insulated with heat-shrink sleeves. The plurality of contact elements may comprise eight contact elements.

The apparatus may further comprise a flushing cage including a seal for sealing the flushing cage to a surface and wherein the electrode is a tubular electrode which extends into the flushing cage, whereby the tubular electrode and the flushing cage are arranged such that a dielectric can be fed via a feed line to an interior chamber of the tubular electrode and an interior chamber of the flushing cage.

The apparatus may further comprise a flushing cage, wherein the grounding device comprises a carrier element that is arranged on the flushing cage, and wherein the at least one contact element extends from the carrier element in a direction of the surface.

The at least one contact element may be arranged to extend generally parallel to at least one of a longitudinal direction of the electrode and a center axis of the electrode.

The apparatus may further comprising carrier plate, wherein the at least one contact element extends from the carrier plate in a direction of the surface. The carrier plate may be made of brass.

The apparatus may further comprise a cylindrically-shaped flushing cage and a carrier plate which extends in a radial direction. The apparatus may further comprise a carrier element including flushing apertures allowing a flow of a dielectric medium and burned-off material released from erosion machining.

The apparatus may further comprise a flushing cage, current conduction lines running from the flushing cage to the power supply, and a metal braid shield surrounding at least the flushing cage. The apparatus may further comprise a sensor, wherein the control device and the sensor, whereby the sensor and the control device allow for a monitoring of the erosion machining.

The eroding head may be supported on a feed drive that at least one of causes, regulates and controls at least one of a feed and an axial movement of the electrode.

The apparatus may further comprise a sensor, wherein the control device at least one of determines and regulates a current feed position of the electrode via a closed-loop function integrated into the control device and based on an interaction with the sensor. The control device may receive, as a control variable, a position of a feed sliding frame that effects the feed of the electrode.

The apparatus may further comprise a rotary drive structured and arranged rotate the electrode during erosion machining. The apparatus may further comprise a flushing cage structured and arranged to allow burned-off particles to be transported away from the flushing cage via a vacuum suction acting in an interior of the flushing cage. The apparatus may further comprise at least one of a position sensor and at least one camera module for a pre-positioning of the eroding head. The apparatus may further comprise at least two camera modules, one camera module being arranged to identify a plurality of connecting elements for rough orientation and pre-positioning of the eroding head with respect to a workpiece, and another camera module being arranged to optically identify an individual connecting element for an image processing system and for a fine positioning of the eroding head, whereby the image processing system determines at least one of a center point and coordinates of the individual connecting element.

The invention also provides for a method of erosion machining and/or removing a connecting element; from a structural component using an erosion machining apparatus comprising a power supply and a control device for producing an erosion current for erosion machining the connecting element, an erosion head including an electrode, a grounding device comprising at least one contact element, and a flushing cage having a seal, interior chamber coupled to a feed line, and being adapted to receive therein a dielectric medium, wherein the method comprises arranging the erosion head in an area of the connecting element, sealing, with the seal, the flushing cage to the structural component, contacting a portion the connecting element with the electrode, and electrically connecting the at least one contact element and another portion of the connecting element so as to form an eroding electric circuit via the electrode and the connecting element.

The method may further comprise during a pre-positioning, at least one of moving the erosion head in two linear axes which are perpendicular to one another, rotating the erosion head around two linear axes which are perpendicular to one another, moving the erosion head in two linear axes which are perpendicular to one another and in a direction that is parallel to an upper side surface of the connecting element, and rotating the erosion head around two linear axes which are perpendicular to one another and moving the erosion head in a direction that is parallel to an upper side surface of the connecting element.

The method may further comprise during a pre-positioning, at least one of using two camera modules to position the electrode in a desired location, wherein one camera module is utilized to identify a plurality of connecting elements for rough orientation and pre-positioning of the erosion head with respect to the structural component, and another camera module is utilized to optically identify an individual connecting element for an image processing system and for a fine positioning of the erosion head, whereby the image processing system determines at least one of a center point of the individual connecting element and coordinates of the individual connecting element.

The invention also provides for an apparatus for spark erosion machining a structure comprising one of a metallic structural component, a metallic insert element, and a connecting element, by way of erosion, wherein the apparatus comprises a portable and/or movably positionable drilling head including a rotating electrode, a power supply, and a control device. The power supply and the control device are electrically connected to the drilling head and producing an erosion current which is conducted between the rotating electrode and the structure. A grounding device is arranged in an area of the drilling head and comprising at least one contact element. The drilling head is removably securable to different areas of the structure. When the drilling head is arranged to perform erosion machining on an area of the structure, the at least one contact element contacts and forms an electrical connection with a surface of the structure such that an eroding electric circuit is formed at least one of between the electrode, the structure and the connecting element, and between the electrode and the connecting element.

The invention also provides for a method of erosion machining and/or removing a connecting element from a structure using an erosion machining apparatus described above, wherein the method comprises removably securing the drilling head to an area of the structure which includes the connecting element, contacting a portion the connecting element with the electrode, and electrically connecting the at least one contact element and another portion of the connecting element so as to form the eroding electric circuit.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 shows a function diagram of the erosion apparatus;

FIG. 4a shows an axial section through an embodiment of the erosion apparatus according to the invention with a drill head, a representation of the electric circuit, as well as a connecting element provided for machining with the erosion apparatus and a part of the structural parts connected by the connecting element;

FIG. 4b shows a plan view of a rivet head to be eroded, surrounded by a component;

FIG. 5 shows a sectional representation of the front part of an embodiment of the drill head with a drill electrode and an embodiment of the grounding device according to the invention; and FIG. 6 shows a front view of the drill head of FIG. 5.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An erosion apparatus according to the invention using a corresponding flushing cage is described below, which apparatus is provided for the application case of a shaping machining of a metallic structural component or of a metallic insert element in a non-metallic structural component, in particular, for the removal of metallic connecting elements, as well as a corresponding method for eroding such elements or components with an erosion apparatus.

Figure 1:
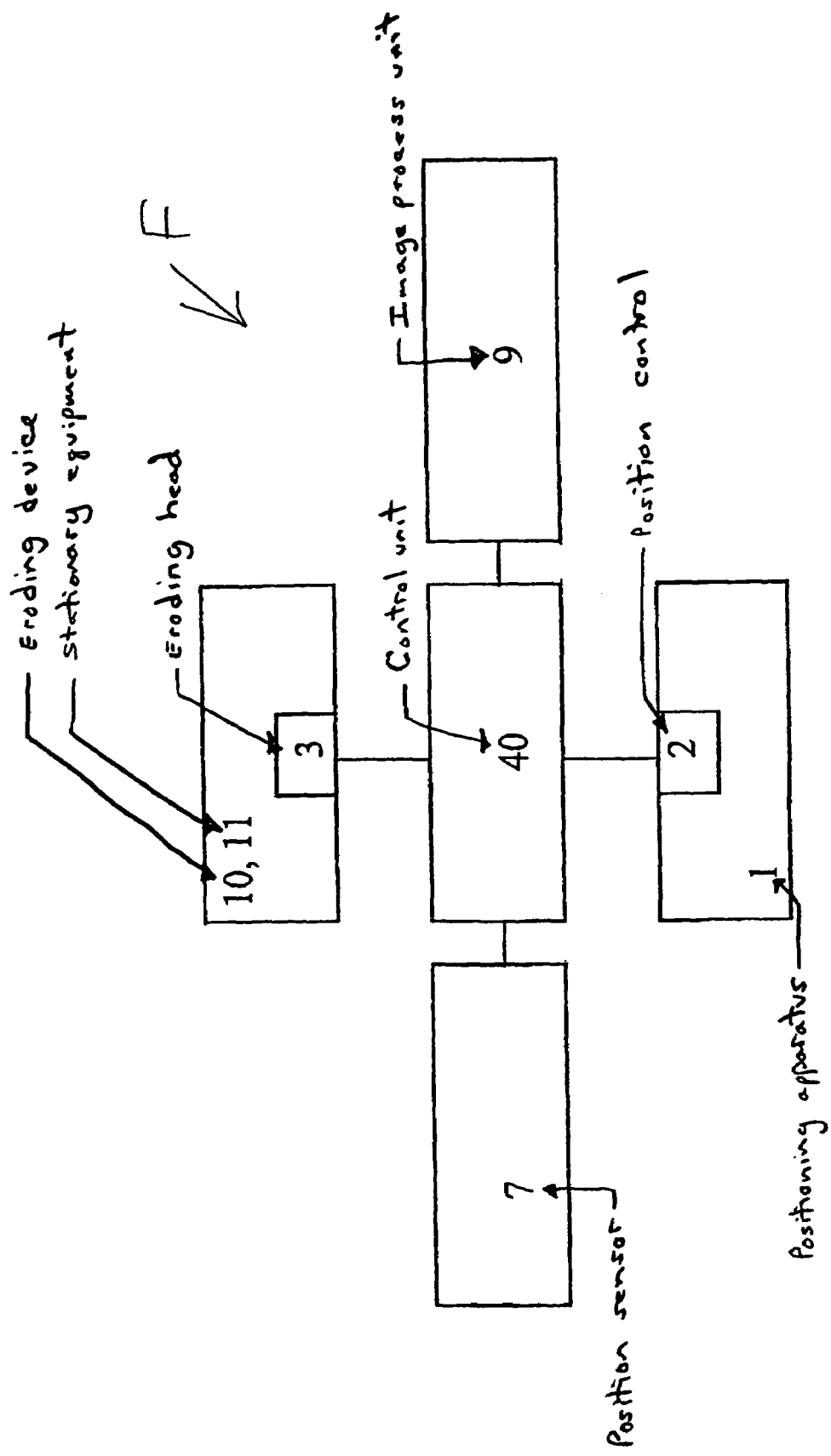
FIG. 1 shows a diagrammatic overview of the main functions or main constituents of the erosion apparatus according to the invention with an optionally usable positioning device.
Figure 2:
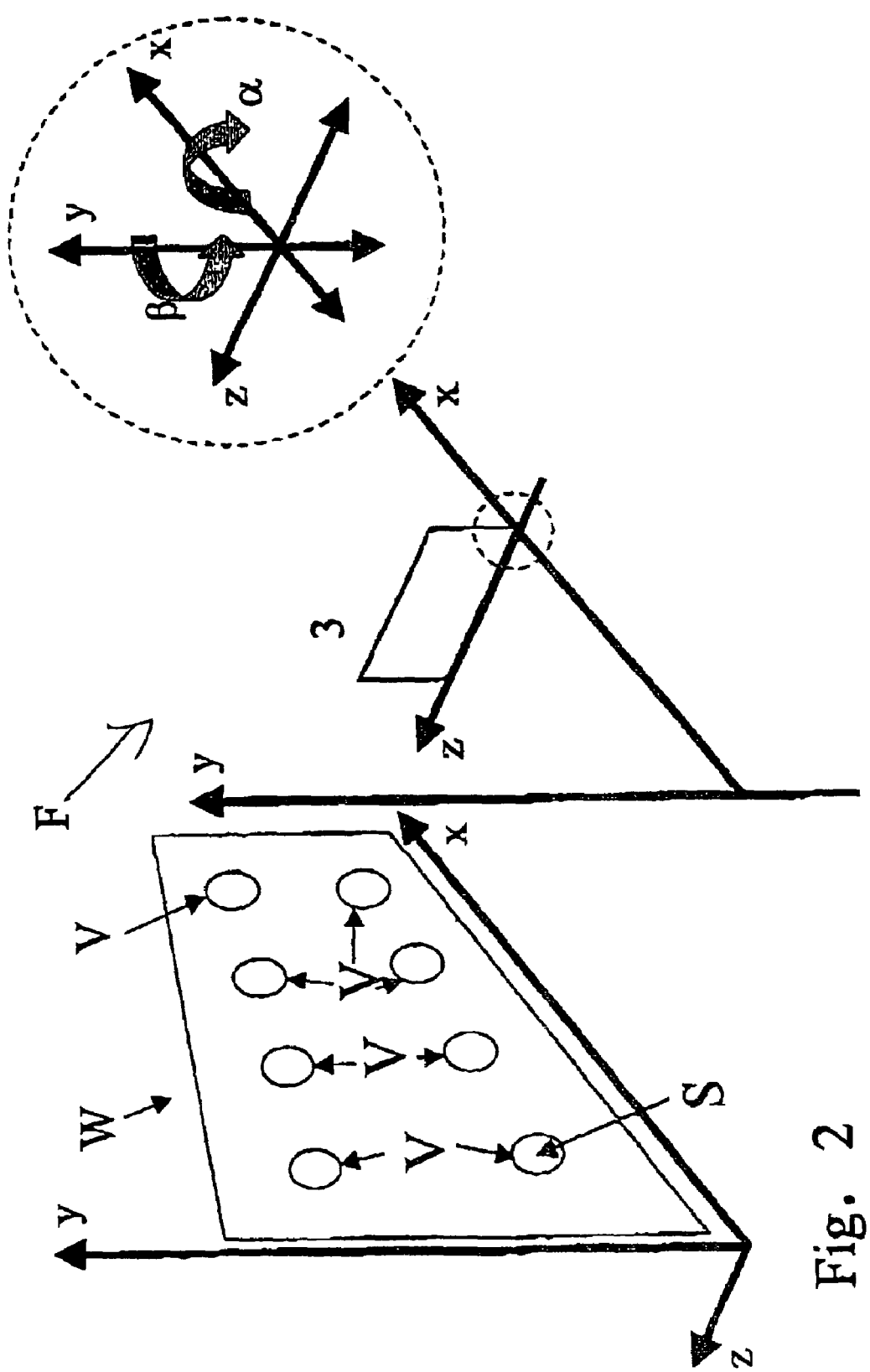
FIG. 2 shows a representation of the directions of movement that are made available by the optionally usable positioning device for positioning the erosion apparatus with respect to positions of connecting elements in a workpiece.

The erosion apparatus F according to the invention (FIG. 1) for removing metallic connecting elements preferably includes a positioning apparatus 1 with a position control 2. The positioning apparatus 1 is provided in order to position an eroding head 3 with a drill head 4 and a flushing cage 17 with corresponding electrical components before the start of the erosion process with respect to a connecting element V to be detached from a workpiece W (FIG. 2). The structure or component surface facing the drill head 4 is labeled in FIG. 2 by the reference mark F, and the surface of the connecting element V facing the drill head 4 is labeled by the reference mark S. The drill head 4, which is carried by a drill head carrier 4a, is moveable by way of the positioning apparatus 1, preferably in three translational and two rotational directions of movement, i.e., in a total of five degrees of freedom.

For the actual erosion process, a feed unit 15 must be available for implementing the feed movements of the drill head 4, in particular, in the axial direction of the connecting element V or in one or more directions of rotation. This can be realized with a standard movement device or with various movement mimics.

The positioning apparatus 1 shown for an erosion apparatus F is embodied as a field portal in order to be able to ensure a positioning of the eroding head 3 or the drill head 4 with sufficient accuracy before the eroding process. The positioning apparatus 1 can also be realized as a robot. In an alternative embodiment, a positioning apparatus 1 can also replace the feed unit 15. Alternatively and/or vice versa, the positioning apparatus 1 can also be replaced by the feed unit 15. The positioning apparatus 1 advantageously features a movement mimic with an of and a "y" linear axis, with which the drill head 4 or the eroding head 3 can be moved parallel to the workpiece surface of the workpiece or the substructure W, and in particular, can be moved parallel to the head or the surface S of the connecting element V in the substructure W that is to be removed. The approach of the drill head 4 to the workpiece W is preferably carried out by way of feed unit 15, which preferably executes linear feed movements, and is optionally pivoted around the "x" and "y" axis of the portal system.

The positioning apparatus 1 can be realized as a field portal with two linear axes in the "x" and the "y" direction. However, other position devices according to the prior art can also be used. Through the propositioning of the eroding head 3 by way of the positioning apparatus 1, the eroding head 3 is brought to a suitable point of the surface S of the connecting element V to be removed, from which point the subsequent erosion process can start. The positioning of the eroding head 3 and the erosion process can also be carried out alternately several times in succession. In carrying out a pre-positioning, of the eroding head 3 by way of the positioning apparatus 1, the apparatus is advantageously first locked in place as soon as the eroding head 3 has reached a desired position and desired location, whereby corrections can still be necessary during the erosion process, if required. In connection with this pre-positioning, the eroding head 3 is preferably additionally orientated by way of the rotary drive 6, in order also to effect a suitable orientation of the eroding head 3 before the start of the erosion process. This pre-positioning can be carried out automatically by way of a position sensor, optionally by way of the image processing unit 9 as well as by way of the position control 2, or can also take place semi-automatically or manually.

An erosion apparatus F optionally provided for carrying out this positioning is described below based on FIG. 1. At the drill head 4 a position sensor 7 connected to a position control 2 is arranged by way of which a determination of the location of the drill head 4 relative to the respective connecting element V to be removed can be undertaken. The position sensor 7 is preferably realized as a field sensor and, in particular, as a laser sensor and can additionally feature a video camera. When a video camera is used, an image processing unit 9 is preferably assigned to the position sensor 7 with which the identification of the position of the connecting element V can be improved by an improved identification of the connecting element geometry. The control of the positioning apparatus 1 is carried out by the position control 2 based on the data from, the position sensor 7, and optionally the image processing unit 9. The necessary parameters for the relative orientation of the drill head carrier 4a to the workpiece W or to the connecting element V are detected thereby by the position sensor 7. When the image processing unit 9 is used, the exact positioning takes place through an image recognition sensor in the form, e.g., of at least one camera module and of a suitable image processing system, whereby the image recognition sensor is preferably attached to the drill head carrier 4a. The video camera, if it is provided, is connected to a monitor 9a via a video signal cable 9b. However, instead of the video camera 9, any other type of appropriate monitoring device for monitoring the rough positioning can be provided. The advantage of using a video camera is that it can also be used after the eroding head 3 has been positioned, to monitor the erosion process as it proceeds.

When two camera modules are used, the first camera module, using a separate monitor, can also be used to first identify a quite large number of connecting elements or connectors V for the rough orientation and pre-positioning of the drill head 4 with respect to the workpiece W. The second camera module is preferably used to optically identify the individual connecting elements V for the image processing system for the fine positioning of the drill head 4. Based on these image data, the image processing system ascertains the center point of the connector and determines the coordinates, which are stored and via which the drill head 4 can again be placed exactly over the once identified connector at any time.

When only one camera module is used, the described functions can also be fulfilled by this one camera module. However, more than two camera modules can also be provided to which the described functions can be distributed in a suitable manner.

The at least one camera module can optionally also be provided for monitoring the chemomechanical erosion process.

After an optionally provided positioning of the eroding head 3 or the drill head 4, which can be carried out, for example, with the described positioning apparatus, the actual removal of the connectors by way of the erosion process or the erosion apparatus F according to the invention or the eroding device 910, respectively, takes place with the eroding head 3 and optionally stationary equipment 11. According to one non-limiting embodiment, the eroding head 3 prepares the connecting element V by weakening the shank of the connecting element V to the point at which, it can subsequently be removed by being struck out or pulled out. This procedure is particularly advantageous when the connecting element V is accessible for the erosion process on the side of the workpiece W on which the surface S or the head of the connecting element V is visible. According to another non-limiting embodiment, in which the connecting element V to be eroded is inaccessible and behind, as seen from the erosion apparatus, i.e., in which the connecting element V cannot be struck out backwards, the complete connector shank is advantageously destroyed by erosion and, if necessary, a remainder of the connecting element V is pulled out forwards.

The erosion apparatus F (FIGS. 3 and 4a, 4b) for carrying out the actual erosion process includes the eroding head 3, the one drill head 4 with a rotatable electrode 15, a grounding device 100, and for the application case described, features a flushing cage 17 and to which a control unit 40 is assigned for its control, and a sensor 7 for ascertaining the location and position of the drill head 4 relative to the substructure W or, depending on the application case, alternatively or additionally, the location and position of the connecting element V, whereby their surfaces F or S are used respectively as reference surfaces for the further description. The erosion apparatus F can be, in particular, a spark-erosion machine. The electrode 15 of the drill head 4 can be, in particular, a tubular electrode. The invention is described below on the basis of a tubular electrode, but the solution according to the invention can also be used for other processes such as, e.g., the attritional erosion method.

To control the eroding process, an erosion control unit 40 is also provided that is functionally connected to the position control 2 and thus to the feed drive 19 that effects the feed of the tubular electrode 15 in the "z" direction (FIG. 2), to the sensor 7, and to an erosion energy source 30 for producing and maintaining the required erosion current. The position control 2 can also be a functional constituent of the erosion control unit 40.

The feed movement of the drill head 4 in the eroding process is preferably achieved by way of a linear feed unit 5 assigned to the drill head 4, which unit is embodied such that the erosion axis runs parallel to the extension of the feed axis of the linear feed unit 5. A rotary drive 6 is provided to effect the rotation of the tubular electrode 15. The rotary drive 6 enables rotating movements of the drill head 4 around two axes running perpendicular to one another, in the representation of FIG. 2 around the vertical or "x" axis and the horizontal or "y" axis. The rotation around the "x" axis results in a feed angle α, whereas the rotation around the y axis results in a feed angle β of the eroding head 3. The feed unit 5 is preferably provided in addition to the positioning apparatus 1, since this advantageously enables a positioning of the drill head 4 with greater accuracy than is usually provided with the positioning apparatus 1. In the exemplary embodiment shown in FIG. 3, the rotary drive 6 with the drill head 4 sits on a feed sliding frame 18 of the linear feed unit 5, which also features for its drive a feed drive 19.

Based on the data supplied by the sensor 7, the erosion control unit 40 ascertains the distance and possibly occurring inclined positions of the eroding head 3 or drill head 4, respectively, relative to the workpiece W. By way of the positioning control 2 in the erosion control unit 40, which preferably features a corresponding closed-loop control, the eroding head 3 can be held in a desired location relative to the workpiece W or connecting element V. In a preferred embodiment of the sensor 7, it features specially arranged laser distance transducers. Both the sensor 7 and the erosion control unit 40 or the position sensor 2 respectively ascertain the distance and possibly occurring inclined positions of the eroding head 3 to the workpiece W. By way of the position control 2 or the erosion control unit 40, respectively and preferably, a corresponding closed-loop control, the eroding head 3 can be held in a desired location relative to the workpiece W. In such a closed-loop control, a possibly occurring inclined position of the workpiece W versus the eroding head 3 is ascertained by way of the sensor 7, for which processes according to the prior art can be used. For example, this can be achieved using three laser distance transducers that form the points of an isosceles triangle, through determining the distance of each individual distance transducer from the workpiece W and by way of trigonometric functions in order to ascertain the normal vector on the plane resulting from the three distances or points. Based on the ascertained location and distance of the eroding head 3 or the drill head 4, respectively, an orientation of the eroding head 3 or the drill head 4 in the direction of the normal vector can take place by way of corresponding control functions in the control unit 40 and a triggering of the rotary drive 6 as well as of the feed drive 19.

For the stated application case of the erosion apparatus in which the connecting element V to be eroded is inaccessible behind as seen from the erosion apparatus, a special embodiment is described below in which a further laser distance transducer (not shown in the figures), preferably a point laser, is used. This can be integrated in the position sensor 7. By way of this laser distance transducer, the drill head 4 is orientated relative to the connector surface S in order to be able to follow the course of the connector shank precisely axially during the eroding. The point laser is moved radially over the head of the respective connector element V with the aid of the positioning control 2 and positioning apparatus 1, as well as the erosion control unit 40. During this movement the respective distance of the point laser from the connecting element V is measured. The normal vector on the resulting plane (circle area) is ascertained by way of its own software algorithm and trigonometric functions. The eroding head 3 is then orientated in the direction of the normal vector.

A flushing cage 17 is provided as a constituent of a flushing system 20, which also includes a filter apparatus 21 and a pump 22. The flushing cage 17 (FIG. 4a) seals an interior chamber 17a around the connecting element 61 sitting in the workpiece W in an area of the tubular electrode 15. The electrode 15 can be arranged so that it can rotate with respect to the flushing cage 17 and the connecting element 61 and can project through the flushing cage 17. The interior chamber 15a of the tubular electrode 15 is charged with dielectric via the feed line 22a, which dielectric is conducted to the surface 61a or S (FIG. 2) of the connecting element 61 or V, respectively, facing the electrode 15.

For the erosion process, the flushing cage 17 is arranged so that the point on the structure 60 at which the connecting element 61 is arranged, can be surrounded and flushed completely with dielectric. For the erosion process, the flushing cage 17 must therefore enclose the entire connecting element 61 on the side of the electrode 15. With this variant of the previously shown sealed point flushing, the erosion process can be carried out in any spatial location of the workpiece 60 or the drill head 4.

With the pump 22, the medium serving as dielectric is fed via a feed line 22a to the flushing cage 17 or the chamber 17a respectively, which dielectric can be fed back from this to the filter apparatus 21 by way of a suction line 22b. The filter apparatus 21 serves to clean the dielectric, while the pump 22 serves to feed the dielectric to the erosion gap via the electrode 15 with sufficient pressure. The reduced pressure suction ensures that the burned-off particles are transported away completely. When the spark-erosion machine is in operation, the chamber 17a is almost completely filled with a dielectric. The electrode 15 is arranged so that it can rotate with respect to the flushing cage 17 and the connecting element 61 and projects through the flushing cage 17. To seal the chamber 17a against the escape of dielectric, a seal 62 is provided between the flushing cage 17 and the electrode 15, as well as a seal 63 to seal the flushing cage 17 from and/or with respect to the workpiece W or the structure.

As the dielectric medium, it is advantageous to use de-ionized water with a conductivity of preferably between approximately 10 μS/cm and approximately 60 μS/cm, but also beyond this range depending on the application case. The use of water has the advantage that the maximum temperatures occurring at the connecting element and the surrounding structure can be held to below approximately 45° C.

The point flushing is to be seen in connection with a ground contacting provided according to the invention at the connecting element and the erosion control unit, with which the erosion current and thus the precise sequence of the eroding process is achieved.

Figure 3:
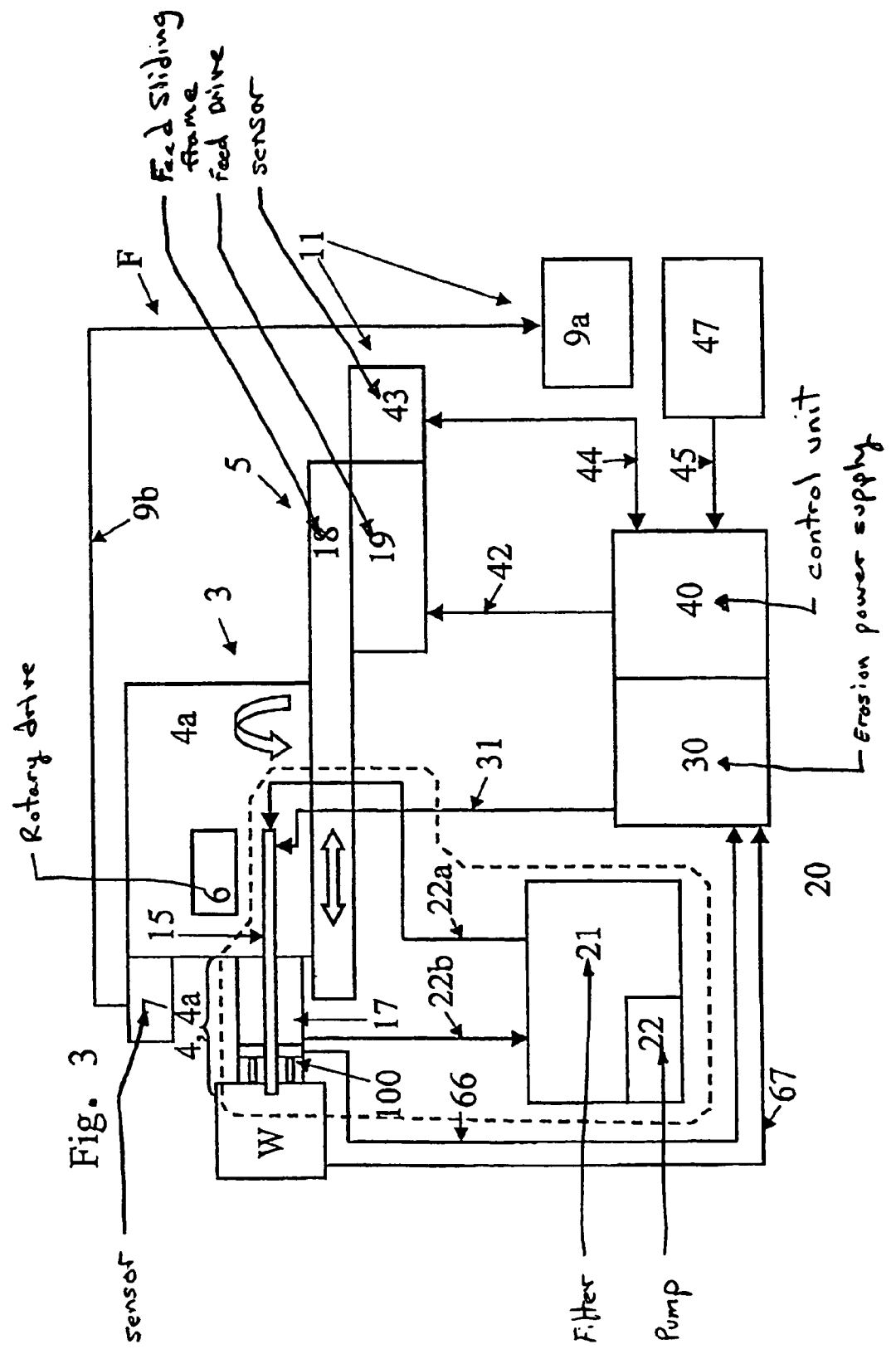

The electrode 15 is connected to the connecting element 61 via a grounding device 100 (FIGS. 3 and 4a, 4b) that is described below in detail. Depending on the application case, other grounding devices can also optionally be used. In FIG. 3, such an optional grounding device is shown in the form of a ground lead 67.

FIG. 4a shows a state in which an electrode 15 shown in the form of a tubular electrode has already formed annular grooves 61b in the connecting element 61 due to the erosion process. It is evident that a gap 61c is forming between the annular groove 61b and the tubular electrode 15. The dielectric in the interior chamber 17a flows through the gap 61c into the chamber 17a of the flushing cage 17, so that it can be conducted to the filter apparatus 21 via the suction line 22b. The dielectric coming from the gap 61c carries eroded material with it that has been formed from the connecting element 61 in the erosion process. In this way, eroded material is removed from the machining site via the line 22b.

The tubular electrode 15 of the embodiment shown is set in rotary motion for the erosion process by the rotary drive 6, in order to prevent uneven wear of the surface of the electrode facing the workpiece. This is important, in particular, when the surface 61a of the connecting element 61 has an uneven surface, e.g., provided with grooves, before the erosion process. In operation, the electrode 15 is first placed axially parallel to the connecting element 61 to be detached or orthogonal to the surface of the structure 60. This takes place via the sensor 7, which, for this purpose, is preferably realized as a laser distance transducer. The tubular electrode 15 is set in rotary motion and the pump 22 is switched on, in order to charge the interior chamber 15a of the tubular electrode 15 with dielectric. This causes the dielectric to flow from the filter apparatus 21 via the feed line 22a through the interior chamber 15a of the tubular electrode 15 and the gap 61c into the interior chamber 17a, and then via the suction line 22b back into the filter apparatus 21.

The erosion control device 40 is connected via an input line 45 to an input device 47 of the process control with which process data can be fed into the control device 40 to configure the eroding process. The erosion control device 40 sends control signals to an erosion power supply 30 with which signals the strength and course of the erosion current or cleavage current is determined and monitored, e.g., the pulse durations, the average amplitude levels and amplitude maxima or the pulse separations of the erosion current. Various parameters can factor in thereby that are derived, e.g., from the electrode material, the workpiece material and size, or the dielectric used. The control data ascertained by the erosion control device 40 represent an optimum for the current to be delivered by the erosion energy source 30.

The erosion power device 30 sends erosion current via a line 31 to the electrode 15 with which the erosion process at the workpiece is effected. As the electric return wire, at least one ground wire 66 is provided that is connected to the grounding device 100 according to the invention. When the invention is used for insert elements and, in particular, connecting elements in non-metallic structural components or in insert elements and in particular connecting elements that are placed in metallic structural components in an insulated manner, further ground connections or ground wires 67 can also be used additionally for reasons of safety, e.g., to produce a required redundancy.

The erosion power device 30 and the erosion control device 40 thereby control the erosion process based on the data of sensor 7, i.e., in particular the erosion current as well as the location and position of the drill head 4 relative to the connecting element V via a command line 42 connected to the rotary drive 6 and the feed drive 19. The respectively current feed position can be maintained via a closed-loop function integrated into the control device 40 that receives as a control variable the position of the feed sliding frame 18 that effects the electrode feed. For this purpose a sensor 43 can be provided alternatively or in addition to the sensor 7, which sensor 43 picks off the position of the drill head 4 on the feed sliding frame 18. By way of the signal line 44, the actual position of the linear axis or the drill head 4 respectively is fed to the control device 40, which issues commands for the feed drive 19 by way of a closed-loop control. The sensor 43 can, for example, be embodied as a rotary pulse generator and be connected to the feed drive 19.

According to the invention, a grounding device 100 (FIGS. 5 and 6) with at least one ground contact element 105 is arranged at the eroding head 3, preferably in the form of a grounding pin that can be brought into contact connection with the upper side of the connecting element 61 during a positioning of the eroding head 3 for the eroding process, in order to produce an eroding electric circuit. The at least one ground contact element or toe at least one grounding pin 105 is connected to a ground wire 66 via a fastening device 101, which wire leads to the erosion power supply 30. Through the at least one ground contact element or the grounding pin 105, a direct contacting of the ground wire 66 with the structural part or insert element to be machined, e.g. the head of a connecting element V to be machined, is achieved in order to close the electric circuit to produce the erosion current. Advantageously, several ground contact elements 105 are provided. The further description of the invention also relates to the use of several ground contact elements 105. The grounding device 100 can in general be arranged on the drill head 4 in various ways. An arrangement is referred to below in which the grounding device 100 is arranged on a flushing cage 17. As explained, the flushing cage 17 can be omitted in certain application cases. For this purpose a carrier element 103 is advantageously provided as part of the fastening device 101, which element is attached to the flushing cage 17 in a mechanically and electrically insulated manner and from which the at least one ground contact element 105 extends in the direction of the surface 61a of the connecting element 61.

When several ground contact elements 105 are used, they can advantageously be switched electrically in parallel.

The connecting element to be detached is labeled in FIG. 5 with the reference number 61 and the workpiece or the component or the component structure in which the connecting element 61 is situated, is labeled with the reference number 60. The structural component 60 can include several structural parts in the area of the insert element or connecting element V to be machined. For example, the component 60 can be formed in two layers comprising a substructure or a carrier element and a top layer lying thereon. The component can also be formed in a single layer or of more than 2 layers in the area of the connecting element V. In aircraft structures in which, for example, a connecting element 61 in the form of a rivet is to be machined, the component 60 can include a planking and a substructure or a support structure such as, e.g., a former in an aircraft structure.

The ground contact elements or grounding pins 105 are therefore connected electrically during the eroding process, on the one hand, to the ground wire 66 and, on the other hand, to the structural component to be machined or to the insert element or connecting element 61 to be eroded (FIGS. 4a, 4b, 5, 6).

In a particular embodiment in which an insert element or connecting element to be machined or eroded is inserted in a structural component in an insulated manner, the current flow is thus not conducted via the structural component 60, but exclusively via the electrode 15 and the insert element or connecting element 61. This causes the erosion process to be limited to the respective insert element or connecting element 61. The reliability with which this goal is achieved is improved by the measures according to the invention for raising the precision of the erosion process with the use of the sensor 7 connected to the erosion control unit 40. Thus, in the erosion process according to the invention, material and structural changes in the structure or the component are avoided in the area that surrounds the connecting element 61. Thus, the component can be re-used with very great safety after the eroding process and, in particular, after the removal of the respective connecting element 61.

In the embodiments in which no flushing cage is used, since the structural component with the insert element or connecting element is optionally immersed in a dielectric bath, the fastening device 101 is attached to the eroding head 3 in another suitable manner.

In the arrangement of the grounding device 100 according to the invention on a flushing cage 17, a carrier element 103 is preferably used to accept the ground contact elements 105, which carrier element is connected to the flushing cage 17 by way of a attachment device 102. When a flushing cage 17 made of a metallic material is used, the attachment device 102 is attached to the flushing cage 17 in an insulating manner. The carrier element 103 can be embodied as a carrier plate that preferably extends in the radial direction of the flushing cage 17, in particular, when the flushing cage 17 is embodied in a cylindrical shape. The carrier element 103 features flushing channels or flushing apertures 104 so that the flushing medium or the dielectric as well as the burned-off material of the eroding process can be carried away. The geometry of the carrier plate is designed so that the flushing medium and the burned-off material can be carried away through the flushing channels in FIG. 6 unhindered.

From the carrier element 103, the ground contact elements 105 extend preferably in the longitudinal direction of the flushing cage 17, and thus in the longitudinal direction of the tubular electrode 15 and when used on the eroding of an insert element or connecting element 61, in the direction of the surface F. The contact pins preferably running in the longitudinal direction of the electrode, i.e., parallel, (see FIGS. 5 and 6) ensure rapid exchangeability in the case of wear.

The ground contact elements 105 are connected to the carrier element 103 with good electric conduction or are anchored in it in this manner. This ensures a minimum electrical contact resistance, so that the dissipation power is held as low as possible. Preferably, the carrier element 103 and the ground contact elements 105 are respectively inherent components of the grounding device 100. Alternatively, however, they can also be provided as a unitary component. In the first case receptacle elements can be provided in the carrier element 103 to receive the ground contact elements 105. Preferably, a specially shaped brass plate is used for the carrier element or the carrier plate 103, to which several ground contact elements 105 are attached. As shown in FIGS. 5 and 6, a tubular electrode 15 is used from which eight ground contact elements 105 arranged concentrically around the tubular electrode 15 extend in the form of grounding pins.

In the arrangement of the grounding device 100 according to the invention on a flushing cage 17, each ground contact element 105, in interaction with the attachment device 102 and the carrier element 103, connects the structural component or the connecting element V to be machined. The grounding takes place via the attachment device 102 of the carrier element 103, which device is attached to the flushing cage housing wall 17b. The pulsed erosion current is up to about 50 A (amps) in the device according to the invention or the method according to the invention. In order to be able to transmit these high currents with the lowest possible dissipation, the contact pins are switched electrically in parallel over the carrier element 103.

The number of ground contact elements 105 is such that if individual pins fail or contact is reduced, the voltage feed to the rivet head is ensured at all times. According to the invention at least between approximately 50% and approximately 100% more ground contact elements 105 will be provided than necessary for a secure contacting. This depends on process conditions. If, e.g., the erosion current is 50 A (amps) and it can be assumed that a current strength of 10 A can be transmitted per pin, at least five ground contact elements 105 are needed. In this example, eight to ten ground contact elements 105 should then be used, in order to ensure a secure current transmission if individual pins fail or become contaminated.

In operation, the ground contact elements 105 are constantly cooled by the fed flushing medium, so that a thermal overload of the contacts is reliably avoided.

In order to avoid a premature wear of the ground contact elements 105 by short circuit behavior due to burned-off particles between the electrode 15 and ground contact elements 105, the electrode 15 is electrically insulated by way of an insulation sleeve 106. This insulation sleeve 106 serves as a non-conductive wrapping and is preferably embodied in the form of a tube, advantageously made of plastic. Alternatively or in addition, the shanks of the ground contact elements 105 can be provided with a jacketing 106 in areas in the longitudinal direction. This does not include the free contact ends 105a, which can be embodied as contact surfaces or contact tips.

The free contact ends 105a of the ground contact elements 105 are preferably capable of being pressed against the surface of the structural component or of the insert- or connecting element to be machined, by way of a corresponding pressing mechanism acting in the longitudinal direction of the ground contact elements 105. The pressing mechanism is preferably a spring arrangement and can also be operated, e.g., by way of compressed air, hydraulically, or electrically. The ground contact elements 105 are embodied thereby so that they can retract. Thus, a reliable contacting is achieved, in particular, with rivet heads that are set in a non-vertical manner and deformed due to defective material or manufacture. For this purpose, the ground contact elements 105 themselves can be flexibly mounted on the carrier element 103. Each ground contact element 105 can also be formed like a telescope and with an integrated spring, so that the free contact ends 105a can be retracted against a spring force. Because the contact ends 105a can be retracted against a spring force, the free contact ends 105a of each of the ground contact elements 105 present can simultaneously come to lie on the surface of the connecting element 61 to be eroded.

Through the current conduction provided according to the invention and the grounding at the structural component or the connecting element 61, if necessary, the use of a flushing cage 17 made of metallic or non-metallic material as well as optionally a ring-shaped arrangement of the ground contact elements 105, the EMC emission, i.e. the electromagnetic compatibility of the erosion current, is minimized. The electromagnetic effect can additionally be optimized by minimizing the lengths of the current conduction lines. In addition, the current conduction lines that run from the flushing cage 17 to the energy power supply 30 can be surrounded by a metal braid shield.

The mode of operation of the component according to the invention in the erosion process for the machining of a metallic connecting element V in a metallic or non-metallic structural component 60 is described below based on FIG. 4.

The level of the dielectric in the flushing system 20 is monitored optionally by way of a corresponding sensor (not shown) and advantageously also in connection with a corresponding function in the erosion control unit 40. If necessary, a replenishment of the dielectric is required. Furthermore, an electrode type that is suitable with respect to the connector type to be removed and that has a suitable diameter is clamped in the drill head 4.

The tubular electrode 15 is placed on the surface facing the tubular electrode 15. The free ends 105a of the ground contact elements 105 thereby come into contact with the surface 61a of the connecting element 61 to be eroded.

In the same operational step or before or after the placing of the tubular electrode 15, the flushing cage, 17 with its seal 63 is placed on the component surface and is pressed against the latter with a predetermined pressing pressure, so that the edge face of the flushing cage 17 on the component side surrounds the surface 61a of the connecting element 61 (FIG. 4a). During the subsequent erosion process, the flushing cage 17 rests in this manner on the component surface, while the electrode 15 is conducted dynamically forwards, i.e., into the material of the connecting element 61. After the flushing cage 17 has been placed, the seal 63 seals the interior chamber 17a of the flushing cage 17 from its surroundings. The placing of the edge face or the sealing 63 of the flushing cage 17 is done in such a way that the at least one ground contact element 105 comes into contact with the surface 61a of the connecting element 61, so that the latter is effective as an electrode. The arrangement comprising the flushing cage 17, the grounding device 100, and the tubular electrode 15 interact mechanically in such a way that the flushing cage 17 with the seal 63 comes to rest on the surface of the component 60 only when the drill head 4 with the tubular electrode 15 has been positioned in the working position. Then, the dielectric is fed to the interior chamber 17a, i.e., the then sealed interior chamber 17a is filled with dielectric medium and the dynamic flushing or the flushing cycle is started. After this, the erosion circuit is created through the erosion control 40 and the erosion energy source 30.

The electrothermal eroding process is controlled by the erosion control 40 and the erosion energy source 30. Defined voltage surges or voltage pulses are produced thereby in the dielectric in order to effect a partial ionization of the dielectric connected with a locally occurring high energy density as well as flashes or conduction channels in a targeted manner. This causes a removal of material in the corresponding connecting element 61. Through the cross-sectional form of the drill electrode 15 a circular groove 61b is formed in the connecting element 61.

Then, the drill head 4 is orientated by way of the positioning apparatus 1 with respect to the connecting element V or 61, respectively, to be removed and the electrode 15 is centered on the surface S or 61a, respectively, of the connecting element V or 61, if necessary with the aid of the image processing unit 9, and necessary fine corrections are undertaken. Then, the actual erosion process is carried out.

The electrode 15 produces a concentric annular groove 61b in the rivet head. When a connecting element head is present, the diameter of the tubular electrodes 15 used must be provided such that the annular groove 61b can be inserted up to the shank lug of the connecting element 61 to be eroded. With customary connecting elements, the outside diameter of the tubular electrode 15 is preferably selected such that the outside diameter of the forming annular groove is preferably between approximately 0.4 mm and approximately 0.5 mm smaller than the diameter of the shank of the connecting element 61. With customary connecting elements, the inside diameter of the tubular electrode 15 is preferably selected such that the residual wall thickness remaining at the shank lug is between approximately 0.2 mm and approximately 0.4 mm. Thus, a targeted weakening of the shank of the connecting element is achieved, it necessary, via a local material embrittlement, and thus a desired breaking point is produced. The rivet shank can then be separated from the rivet head in a defined manner by way of a mechanical impact, when the eroding process is stopped at an appropriate point in time.

The work electrode, e.g., the tubular electrode 15, is conducted with predetermined precision centrally and coaxially to the longitudinal axis of the connecting element 61 to be removed. As described above, this is preferably achieved by way of the sensor 7 in connection with the erosion control unit 40 as well as by way of the linear feed unit 5 assigned to the drill head 4 and whose feed axis runs parallel to the extension of the erosion axis. Through the use of a tubular electrode 15 as a work electrode; the electrothermal material removal takes place exclusively in the material of the connecting element 61 to be removed. It is thus additionally achieved that the component is not changed in the area of the bore or in the seat of the connecting element 61. In particular, in this area a structural change in the material of the component surrounding the connecting element is also avoided.

Depending on the requirements for the eroding process set in the individual case, the eroding process can be controlled so that a targeted weakening of the connecting element 61 to be eroded is achieved, i.e., the production of a desired breaking point on it in order to remove the connecting element 61 with targeted breaking-off, or the complete eroding of the connecting element 61.

Through the tubular electrode 15 provided according to the invention and a ground connection by way of at least one ground contact element that has direct contact during the eroding process with the head of the connecting element to be detached, the circuit at the connecting element 61 to be eroded is itself closed, i.e., the current flow does not go through the structure or the component 60 in which the connecting element 61 is installed. From the electrical engineering point of view, therefore, the work electrode 15 that forms the groove 61b in the rivet head through the eroding process represents an electrode and, due to the ground contacting according to the invention, the connecting element to be eroded represents a counter electrode. It is thus possible that the eroding process for the removal of not only metallic connecting elements, but also connecting elements made of any desired, in particular, electrically non-conducting, substrates, such as, e.g., made of all composite materials such as carbon fiber or glass fiber materials, can be carried out. The eroding process according to the invention also functions for connecting elements that are, e.g., inserted in the component seat to prevent electrochemical corrosion effects with a non-conducting insulation (electrically insulated assembly). Moreover, it is also possible to carry out the eroding process independent of the material of the component, in particular, in the area of the connecting element 61.

Partially eroded connecting elements are optionally removed by striking them out.

These steps can be repeated on further connecting elements.

The flushing cage 17 can also be pressed against the structural component 60 by way of a vacuum or by way of a hydraulic system.

In embodiments in which no flushing cage is used, since the structural component to be machined or the insert element or connecting element to be machined are immersed in a dielectric bath, the steps and/or stages of pressing a flushing cage are omitted.

Instead of a tubular electrode, the solution according to the invention can also be used with other electrodes according to prior art. In particular, the use of a full and/or solid electrode is suitable.

The erosion apparatus according to the invention can be used for the shaping machining of a metallic structural component, whereby the structural component is completely or partially immersed in a dielectric bath. This can be omitted through the use of a flushing cage and a feed device or a positioning apparatus. In both cases, a metallic insert element in a metallic or non-metallic structural component can be machined, in particular, for the removal of metallic connecting elements from the structural component.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein, rather, the present invention extends to all functionally equivalent structures, methods and uses, such as are within the scope of the appended claims.

What is claimed:

1. An apparatus for erosion machining a structure comprising one of a metallic structural component, a metallic insert element, and a connecting element, by way of erosion, the apparatus comprising:
an eroding head including an electrode;
a power supply;
a control device;
the power supply and the control device producing an erosion current;
a grounding device arranged in an area of the eroding head and comprising at least one contact element; and
a carrier plate,
wherein the at least one contact element extends from the carrier plate in a direction of the surface, and
wherein, when the eroding head is arranged to perform erosion machining, the at least one contact element contacts and forms an electrical connection with a surface of the structure, whereby an eroding electric circuit is formed via the electrode and the structure.

2. The apparatus of claim 1, wherein the eroding head comprises a drill head and wherein the electrode comprises a tubular electrode.

3. The apparatus of claim 1, wherein the at least one contact element comprises at least one of a retractable contact end and a spring biased retractable spring contact end.

4. The apparatus of claim 1, wherein the at least one contact element comprises a plurality of contact elements arranged generally concentrically around the electrode.

5. The apparatus of claim 4, wherein the plurality of contact elements are at least one of switchable electrically and switchable electrically in parallel.

6. The apparatus of claim 4, wherein shank portions of the plurality of contact elements are at least one of electrically insulated and insulated with heat-shrink sleeves.

7. The apparatus of claim 4, wherein the plurality of contact elements comprises eight contact elements.

8. The apparatus of claim 1, further comprising a flushing cage including a seal for sealing the flushing cage to a surface and wherein the electrode is a tubular electrode which extends into the flushing cage, whereby the tubular electrode and the flushing cage are arranged such that a dielectric can be fed via a feed line to an interior chamber of the tubular electrode and an interior chamber of the flushing cage.

9. The apparatus of claim 1, further comprising a flushing cage, wherein the grounding device comprises the carrier plate being arranged on the flushing cage, and wherein the at least one contact element extends from the carrier plate in a direction of the surface.

10. The apparatus of claim 1, wherein the at least one contact element is arranged to extend generally parallel to at least one of a longitudinal direction of the electrode and a center axis of the electrode.

11. The apparatus of claim 1, further comprising at least one of a position sensor and at least one camera module for a pre-positioning of the eroding head.

12. The apparatus of claim 1, wherein the carrier plate is made of brass.

13. The apparatus of claim 1, further comprising at least two camera modules, one camera module being arranged to identify a plurality of connecting elements for rough orientation and pre-positioning of the eroding head with respect to a workpiece, and another camera module being arranged to optically identify an individual connecting element for an image processing system and for a fine positioning of the eroding head, whereby the image processing system determines at least one of a center point and coordinates of the individual connecting element.

14. The apparatus of claim 1, further comprising:
a cylindrically-shaped flushing cage from which the carrier plate extends in a radial direction; and
the carrier plate including flushing apertures allowing a flow of a dielectric medium and burned-off material released from erosion machining,
wherein the at least one contact element comprises at least one of a retractable contact end and a spring biased retractable spring contact end, and
wherein the at least one contact element comprises a plurality of contact elements arranged generally concentrically around the electrode.

15. The apparatus of claim 1, further comprising a flushing cage, current conduction lines running from the flushing cage to the power supply, and a metal braid shield surrounding at least the flushing cage.

16. The apparatus of claim 1, further comprising a sensor, wherein the control device and the sensor, whereby the sensor and the control device allow for a monitoring of the erosion machining.

17. The apparatus of claim 1, wherein the eroding head is supported on a feed drive that at least one of causes, regulates and controls at least one of a feed and an axial movement of the electrode.

18. The apparatus of claim 1, further comprising a sensor, wherein the control device at least one of determines and regulates a current feed position of the electrode via a closed-loop function integrated into the control device and based on an interaction with the sensor.

19. The apparatus of claim 18, wherein the control device receives, as a control variable, a position of a feed sliding frame that effects the feed of the electrode.

20. The apparatus of claim 1, further comprising a rotary drive structured and arranged rotate the electrode during erosion machining.

21. The apparatus of claim 1, further comprising a flushing cage structured and arranged to allow burned-off particles to be transported away from the flushing cage via a vacuum suction acting in an interior of the flushing cage.

22. An apparatus for erosion machining a structure comprising one of a metallic structural component, a metallic insert element, and a connecting element, by way of erosion, the apparatus comprising:
an eroding head including an electrode;
a power supply;
a control device;
the power supply and the control device producing an erosion current;
a cylindrically-shaped flushing cage and a carrier plate which extends in a radial direction;
a grounding device arranged in an area of the eroding head and comprising at least one contact element,
wherein, when the eroding head is arranged to perform erosion machining, the at least one contact element contacts and forms an electrical connection with a surface of the structure, whereby an eroding electric circuit is formed via the electrode and the structure.

23. An apparatus for erosion machining a structure comprising one of a metallic structural component, a metallic insert element, and a connecting element, by way of erosion, the apparatus comprising:
an eroding head including an electrode;
a power supply;
a control device;

the power supply and the control device producing an erosion current;

a carrier element including flushing apertures allowing a flow of a dielectric medium and burned-off material released from erosion machining; and a grounding device arranged in an area of the eroding head and comprising at least one contact element, wherein, when the eroding head is arranged to perform erosion machining, the at least one contact element contacts and forms an electrical connection with a surface of the structure, whereby an eroding electric circuit is formed via the electrode and the structure.

24. A method of erosion machining and/or removing a connecting element from a structural component using an erosion machining apparatus comprising a power supply and a control device for producing an erosion current for erosion machining the connecting element, an erosion head including an electrode, a grounding device comprising at least one contact element, and a flushing cage having a seal, interior chamber coupled to a feed line, and being adapted to receive therein a dielectric medium, the method comprising:

arranging the erosion head in an area of the connecting element;

sealing, with the seal, the flushing cage to the structural component;

contacting a portion the connecting element with the electrode; and electrically connecting the at least one contact element and another portion of the connecting element so as to form an eroding electric circuit via the electrode and the connecting element, wherein the at least one contact element extends from a carrier plate in a direction of the surface.

25. The method of claim 24, further comprising during a pre-positioning, at least one of:

moving the erosion head in two linear axes which are perpendicular to one another;

rotating the erosion head around two linear axes which are perpendicular to one another;

moving the erosion head in two linear axes which are perpendicular to one another and in a direction that is parallel to an upper side surface of the connecting element; and rotating the erosion head around two linear axes which are perpendicular to one another and moving the erosion head in a direction that is parallel to an upper side surface of the connecting element.

26. The method of claim 24, further comprising during a pre-positioning, at least one of:

using two camera modules to position the electrode in a desired location, wherein one camera module is utilized to identify a plurality of connecting elements for rough orientation and pre-positioning of the erosion head with respect to the structural component, and another camera module is utilized to optically identify an individual connecting element for an image processing system and for a fine positioning of the erosion head, whereby the image processing system determines at least one of a center point of the individual connecting element and coordinates of the individual connecting element.

27. An apparatus for spark erosion machining a structure comprising one of a metallic structural component, a metallic insert element, and a connecting element, by way of erosion, the apparatus comprising:

a portable and/or movably positionable drilling head including a rotating electrode;

a power supply;

a control device;

the power supply and the control device being electrically connected to the drilling head and producing an erosion current which is conducted between the rotating electrode and the structure;

a grounding device arranged in an area of the drilling head and comprising at least one contact element; and a carrier element including flushing apertures allowing a flow of a dielectric medium and burned-off material released from erosion machining, wherein the drilling head is removably securable to different areas of the structure, and wherein, when the drilling head is arranged to perform erosion machining on an area of the structure, the at least one contact element contacts and forms an electrical connection with a surface of the structure such that an eroding electric circuit is formed at least one of between the electrode, the structure and the connecting element, and between the electrode and the connecting element.

28. A method of erosion machining and/or removing a connecting element from a structure using an erosion machining apparatus of claim 27, the method comprising:

removably securing the drilling head to an area of the structure which includes the connecting element;

contacting a portion the connecting element with the electrode; and electrically connecting the at least one contact element and another portion of the connecting element so as to form the eroding electric circuit.

* * * * *